United States Patent Office 3,387,004
Patented June 4, 1968

3,387,004
CERTAIN SUBSTITUTED QUINONES AND
THEIR PREPARATION
William Lindsay Mosby, North Plainfield, and Mary-Louise Silva, Somerville, N.J., assignors to American Cyanamid Company, Stamford, Conn., a corporation of Maine
No Drawing. Filed May 2, 1963, Ser. No. 277,472
11 Claims. (Cl. 260—349)

This invention relates to, and has for its object, the provision of a new class of organo phosphorus compounds. More particularly, it relates to the provision of novel phosphoranylideneamino derivatives distinguished by a para-quinonoid radical attached to the amino nitrogen thereof. It relates further to the novel method by which these derivatives are prepared, viz: the reaction of azido-paraquinones with a trivalent phosphorus compound. It relates still further to a new process wherein said derivatives are hydrolyzed, thereby yielding certain new phosphinylamino-paraquinones. The invention will be better understood if reference is made to the following detailed description taken in conjunction with the examples showing practice of all the aspects thereof.

The present invention is based on the discovery that the novel reaction of azido-paraquinones with trivalent phosphorus compounds leads to products which are useful as dyestuffs, as the active components of insecticides, and as intermediates for other compounds as will be described hereinafter. These products may be represented by the formula (I):

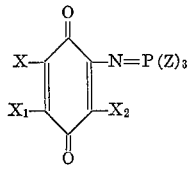

wherein X, $X_1$ and $X_2$ are individually either hydrogen, halogen, alkyl (especially lower alkyl such as methyl, ethyl, butyl, hexyl, cyclohexyl and heptyl), alkoxy (especially lower alkoxy such as methoxy, ethoxy and amyloxy), aryl (especially monocyclic aryl), aralkyl (especially monocyclic lower aralkyl such as benzyl and phenethyl), amino, cyano, thiocyano, alkanoyl (especially lower alkanoyl), mono- and bicyclic aroyl (e.g., benzoyl and α-naphthoyl), lower alkanoyloxy, nitroso, lower alkylsulfonyl, mono- and bicyclic arylsulfonyl, alkylthio (especially lower alkylmercapto radicals such as methylthio and ethylthio), arylthio (especially monocyclic arylthio radicals such as phenylthio), lower alkanoylamino or nitro. The $X_2$ symbol may additionally denote an azido group, or the —N=P(Z)$_3$ group. X and $X_1$, alternatively, may be joined together to form a benzo moiety attached to the quinonoid moiety in the 5 and 6 positions thereof. Such benzo moieties may have up to 4 substituents such as halo (e.g., chloro or bromo), nitro, amino or lower alkanamido (e.g. acetamido) radicals. The invention also contemplates compounds of the type represented in Formula I wherein alkyl, aralkyl and aryl moieties have simple substituents such as halo, alkoxy, hydroxy and/or nitro moieties. In Formula I, the Z symbols in the phosphoranylideneamino moiety (II):

$$-N=P(Z)_3$$

are individually intended to represent either secondary or tertiary amino groups, alkyl, alkenyl, aralkyl, aralkenyl, aryl, alkoxy, alkenoxy, aralkoxy, or aralkenoxy groups. As is explained in more detail infra, the nature of the Z groups is determined by the structure of the trivalent phosphorus compound reacted with the azido-paraquinone to form compounds of Formula I.

Compounds of Formula I are prepared by the novel reaction of either a monoazido- or a diazido-paraquinone with either one or two moles of the phosphorus reagent:

$$P(Z)_3$$

wherein the Z radicals are as defined above. The molar ratio of reactants which is utilized, is dictated by the number of phosphoranylideneamino groups which is desired in the reaction product. If a monoazido-paraquinone is reacted, only one mole of the phosphorus reagent is required. If a diazido-paraquinone is reacted, use of one mole of phosphorus reagent will primarily yield the monophosphoranylideneamino derivative. Use of two moles of the phosphorus reagent will primarily yield the diphosphoranylideneamino derivative. Reaction is initiated upon contact of the azido-paraquinone with the trivalent phosphorus compound. Contact is best effected in an inert organic diluent which is preferably a solvent for the reactants. Suitable for this purpose are aromatic hydrocarbons (such as benzene and toluene), haloalkanes (such as methylene chloride, chloroform, ethylene chloride and carbon tetrachloride), halobenzenes (such as chlorobenzene), alkyl alkanoates (such as ethyl acetate), nitromethane and ethers (such as ethyleneglycol dimethyl ether and dibutyl ether).

Advantageously, reaction proceeds at ambient temperatures (e.g., 20°–30° C.), and neither heating nor cooling is necessary. But higher and lower temperatures may be employed, if it is desired to increase or decrease the reaction rate in any particular case.

After about one hour, the reaction may be terminated and the product isolated by evaporation of the diluene and washing the residue with petroleum ether, cyclohexane, or the like. Further purification by chromotography and/or recrystallization may be effected as deemed desirable for the intended use of the product.

Azido-paraquinones used in the preparation of compounds of Formula I may be prepared by reacting a compound of the Formula III:

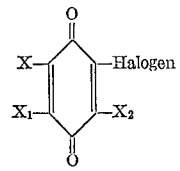

(III)

(wherein X, $X_1$ and $X_2$ are as defined above and "halogen" is fluorine, chlorine, bromine or iodine) with an alkali metal azide, e.g., sodium azide. This reaction is conducted by contacting III with one or two moles of the metal azide at a temperature between about 0° to 25° C. and in a solvent medium such as dimethyl formamide, ethanol, acetonitrile, diglyme and dimethylsulfoxide. After about 15 minutes to one hour, the product may be isolated by dilution with water and filtration. The general procedure has been described by Fries and Ochwat, Ber. 56, 1291 (1923) and by Korczynski, Bull. Soc. Chim. France [4] 35, 1189 (1934).

Among the azido-paraquinones which may be prepared by the foregoing reaction and used to prepare the phosphoranylideneamino compounds of this invention are the following:

2-azido-1,4-benzoquinone,
2-azido-3-methyl-1,4-benzoquinone,
2-azido-3-hexyl-1,4-benzoquinone,
2-azido-3-methoxy-,4-benzoquinone,
2-azido-3-acetoxy-1,4-benzoquinone,
2-azido-3-acetyl-1,4-benzoquinone,
2-azido-3-nitro-1,4-benzoquinone,
2-azido-3-chloro-1,4-benzoquinone,
2-azido-3-phenyl-1,4-benzoquinone, 2-azido-3,5,6-trichloro-1,4-benzoquinone,
2,3-diazido-1,4-naphthoquinone,
2-azido-3-chloro-1,4-naphthoquinone,
2-azido-6-methylsulfonyl-1,4-naphthoquinone,
2-azido-3-methyl-1,4-naphthoquinone,
2-azido-3-methoxy-1,4-naphthoquinone,
2-azido-3-methylthio-1,4-naphthoquinone,
2-azido-5-nitro-1,4-naphthoquinone,
2,3-diazido-1,4-benzoquinone,
2,3-diazido-5-benzyl-1,4-benzoquinone,
2,3-diazido-5,6-dimethyl-1,4-benzoquinone,
2,3-diazido-5,6-dimethoxy-1,4-benzoquinone,
2,3-diazido-5-acetoxy-1,4-benzoquinone,
2,5-diazido-3,6-dichloro-1,4-benzoquinone,
2,3-diazido-5-phenyl-1,4-naphthoquinone,
2,3-diazido-6-methylthio-1,4-naphthoquinone,
2,3-diazido-7-phenylthio-1,4-naphthoquinone,
2,3-diazido-5-nitro-1,4-naphthoquinone,
2,3-diazido-1,4-naphthoquinone,
2,3-diazido-5-methyl-1,4-naphthoquinone,
2,3-diazido-5,8-dichloro-1,4-naphthoquinone,
2,3-diazido-6-acetyl-1,4-naphthoquinone,
2,3-diazido-5,6,7,8-tetrachloro-1,4-naphthoquinone,
2,3-diazido-6,7-thiocyano-1,4-naphthoquinone,
2,3-diazido-6-benzoyl-1,4-naphthoquinone,
2,3-diazido-6-methylsulfonyl-1,4-naphthoquinone and
2,3-diazido-6-phenylsulfonyl-1,4-naphthoquinone.

Many trivalent phosphorus compounds may be employed in the above-described reaction. Generally, such compounds will have phosphorus to hydrogen, phosphorus to carbon, phosphorus to nitrogen, and/or phosphorus to oxygen bonds. Preferably, the compounds should have no more than two phosphorus to hydrogen bonds, and the remaining bonds should be to either oxygen, nitrogen or carbon. Such compounds are known and available through conventional synthetic routes. For purposes of illustration, the following types of phosphorus reagents may be named:

(a) Phosphites (1) Alkyl phosphites, especially those wherein the alkyl groups have no more than 18 carbons including: trimethyl phosphite, triethyl phosphite, tricyclohexyl phosphite, trioctyl phosphite, trioctadecyl phosphite;

(2) Alkenyl phosphites, especially those having no more than 18 carbons in each alkenyl group, including: trivinyl phosphite, triallyl phosphite and trioleyl phosphite;

(3) Aralkyl phosphites, especially those wherein the aralkyl moiety is a mono- or bicyclic ar(lower alkyl) radical including: tribenzyl phosphite, tri($\beta$-phenethyl) phosphite, tri(2-naphthylmethyl) phosphite, dimethyl benzyl phosphite and phenyl bis (6-phenylhexyl) phosphite.

(4) Aralkenyl phosphites, especially those wherein the aralkenyl moiety is a mono- or bicyclic ar(lower alkenyl) radical including: tricinnamyl phosphite, tristyryl phosphite, and dimethyl styryl phosphite.

(b) Phosphines (1) Alkyl phosphines, especially those wherein the alkyl radicals have no more than 18 carbons including: trimethylphosphine, triethylphosphine, trioctylphosphine, tristearylphosphine, and tricyclohexylphosphine;

(2) Alkenyl phosphines, especially those wherein the alkenyl radical has no more than 18 carbons including: trivinylphosphine, dimethylvinylphosphine, triallylphosphine, dimethyl-2-cyclohexenylphosphine, trilinoleylphosphine and butyl-diallylphosphine;

(3) Arylphosphines, especially those in which the aryl moiety is carbocyclic and has less than three 6-membered rings including: triphenylphosphine, tri-$\alpha$-naphthylphosphine, tri - $\beta$ - naphthylphosphine, dimethyl-phenylphosphine, dihexyl-phenylphosphine, diethyl-$\beta$-naphthylphosphine, methyl - diphenylphosphine, vinyl-diphenylphosphine, diallyl-phenylphosphine and divinyl-$\beta$-naphthylphosphine;

(4) Aralkylphosphines, especially those in which the aralkyl moiety is a mono- or bicyclo carbocyclic ar(lower alkyl) radical including: tribenzylphosphine, tri-$\beta$-phenethylphosphine, tri-$\beta$-naphthylmethylphosphine, dimethylbenzylphosphine, diallyl-benzylphosphine and phenyldibenzylphosphine;

(5) Aralkenyl phosphines, especially these in which the aralkenyl moiety is a mono- or bicyclic carbocyclic ar-(lower alkenyl) radical including: tricinnamylphosphine, tristyrylphosphine, dimethyl-styrylphosphine and diphenyl-cinnamylphosphine;

(c) Phosphorous triamides including: lower alkyl phosphorous triamides (e.g., trimethylphosphorous triamide, N - methyl-N',N''-dibutylphosphorous triamide, tricyclohexylphosphorous triamide, hexamethylphosphorous triamide, hexaethylphosphorous triamide, N,N - dimethylphosphorous triamide and N,N,N',N'-tetrapropylphosphorous triamide), lower alkenyl phosphorous triamides [e.g., trivinylphosphorous triamide, triallylphosphorous triamide, N,N',N'' - trimethyl-N,N',N''-triallylphosphorous triamide and tri-(2-cyclohexenyl) - phosphorous triamide], aryl, especially monocyclic and bicyclic aryl phosphorous triamides [e.g., triphenyl phosphorous triamide, tri-($\beta$-naphthyl)-phosphorous triamide, N-allyl-N',N''-diphenyl-phosphorous triamide and N,N',N''-trimethyl-N,N',N''-triphenylphosphorous triamide], aralkyl, especially monocyclic ar(lower alkyl) phosphorous triamides [e.g., tribenzyl phosphorous triamide, tri-($\beta$-phenethyl) - phosphorous triamide, tri-($\beta$-naphthylmethyl)phosphorous triamide, N,N-dimethyl - N',N'' - dibenzylphosphorous triamide, benzylphosphorous triamide, N,N' - divinyl-N''-benzylphosphorous triamide and N-phenyl-N'-benzylphosphorous triamide] and aralkenyl phosphorous triamides, especially those in which the aralkenyl moiety is a monocyclic ar(lower alkenyl) radical (e.g., tricinnamylphosphorous triamide, tristyrylphosphorous triamide, N,N'-dimethyl-N''-cinnamylphosphorous triamide, N-cinnamyl-N',N'' - diphenylphosphorous triamide, N-benzyl-N',N''-distyrylphosphorous triamide, N-allyl-N',N''-dicinnamyl-phosphorous triamide and cinnamylphosphorous triamide.

The foregoing does not by any means complete the list of trivalent phosphorous reagents useful herein. For example, asymmetrical phosphorous compounds having one carbon to phosphorus and two phosphorus to nitrogen bonds (i.e., phosphonous diamides), two phosphorus to carbon bonds and one phosphorus to nitrogen bond (i.e., phosphinous amides), a phosphorus to carbon bond, a phosphorus to oxygen and a phosphorus to nitrogen bond (i.e., phosphonamidous compounds) may likewise be employed. In these asymmetrical compounds, the oxygen, carbon and nitrogen free valences may be substituted by the same groups named in the foregoing description of useful phosphines, phosphites and phosphorous triamides. Also useful are heterocyclic trivalent phosphorus compounds in which at least one substituent is a 5- or 6-membered nitrogen heterocycle such as pyrrolidino, piperidino, pyridyl, pyrimidyl, piperazino, etc.

Moreover in all the foregoing categories of reagents, those with groups having replaceable hydrogens attached to carbon may bear up to four or five simple substituents such as lower alkyl (on cyclic groups), halo, lower alkoxy, hydroxy, amino, nitro, cyano, amido and carboxy radicals, etc.

It is important to note that not all classes of trivalent phosphorous compounds can be used as reagents for reaction with the azido-paraquinone reactants. Thus, the phosphorus reagents which have been found inoperable for purposes of this invention are inorganic phosphites such as phosphorous trichloride; arylphosphites such as triphenylphosphite and all thiophosphites.

Compounds of Formula I have many uses. In that they are colored solid materials, insoluble in water and in many organic solvents, they are useful as pigments. Moreover, they exhibit biocidal properties and may be used as the active components of fungicidal, bactericidal and insecticidal compositions. They may also be used as intermediates in the synthesis of other organic compounds. As an example of such intermediary use, it has been discovered that many of the compounds within the scope of Formula I, i.e., those having at least one phosphorus to oxygen bond, may be converted to the corresponding phosphinylamino derivative. This may be accomplished by treating the respective starting materials with an aqueous strong acid (e.g., hydrochloric, sulfuric, nitric, phosphoric and toluenesulfonic acids). This hydrolytic reaction proceeds best at elevated temperatures (for example, between 50° C. and reflux) employing a solvent (e.g., acetic acid, ethanol, methoxyethanol and ethyleneglycol). It is illustrated by the following reaction:

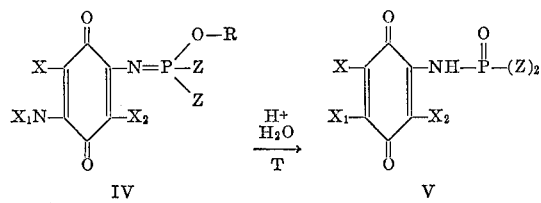

Equation A wherein X, $X_1$, $X_2$ and Z are as above-defined and R=lower alkyl, lower alkenyl or aralkyl.

Of course, in the case when $X_2$ represents a phosphoranylideneamino moiety, this likewise may be hydrolyzed, in which case the product of hydrolysis is a bis-(phosphinylamino) derivative.

Products represented by Formula V are new compounds which have utility as pigments and dyes for plastics by virtue of their being colored solids which are insoluble in both water and many organic solvents.

It will be noted that certain para-quinonoid products referred to throughout the foregoing description and exemplified hereinbelow, are capable of existing in other tautomeric forms. These have not been particularly discussed, since tautomeric relationships which do exist follow general principles of tautomerism and should be obvious from the formulae which have been illustrated above. For example, the paraquinones of Formula V may exist in the following tautomeric relationship.

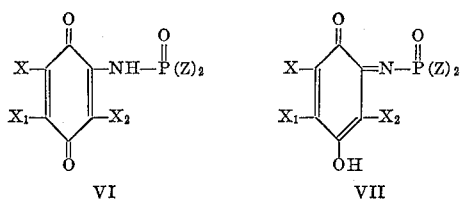

Since nomenclature for this class of products is rather difficult, it may be useful to outline the system used herein. In the $—N=P(Z)_3$ radical called for by Formula I, the $—N=P≡$ part is common to all compounds. This group may be considered to be derived from the parent compound $HN=PH_3$, iminophosphorane or phosphine imide. However, if the $—N=P≡$ group is considered as a substituent, the same is called phosphoranylideneamino and the product can be termed a "monophosphoranylideneamino derivative of a paraquinone." Of course, each type of product (depending on value of Z) has its own nomenclature by the Chemical Abstracts system. Where the Z's in $—N=P(Z)_3$ are all —OR or $—NH_2$, the products are derivatives of a phosphorimidic acid. Where two Z's are —OR or $—NH_2$ and the other is H or R, the products are derivatives of phosphonimidic acid. Where one Z is —OR or $—NH_2$ and the others are H or R, the products are derivatives of a phosphinimidic acid. And where all Z's are H or R, the products are derivatives of a phosphine imide. The products obtained by hydrolysis of the

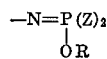

group have the

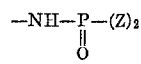

moiety. The

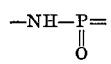

group can be termed a "phosphinylamino" group. Where the Z's are —OR or $—NH_2$, the products are derivatives of phosphoramidic acid. Where one Z is H or R and the other is —OR or $—NH_2$, the products are derivatives of phosphonamidic acid. Where both Z's are H or R, the products are phosphinic amides. The hydrolysis products may generally be called phosphinylamino derivatives of para-quinones.

The following examples are presented in further illustration of this invention. All parts are on a weight basis and all temperatures are in centigrade.

EXAMPLE 1

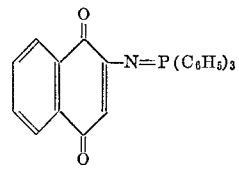

A solution of 2.75 parts (0.0105 mole) of triphenylphosphine in 10 parts of ethyl acetate is added to a solution of 2.0 parts (0.01 mole) of 2-azido-1,4-naphthoquinone in 45 parts of ethyl acetate at 25° C. The reaction mixture is heated at the boiling point until the evolution of gas ceases, and the solvent is evaporated until the residue occupies a small volume. The addition of petroleum ether precipitates brick-red crystals, which after recrystallization from suitable solvents, melt at 176.5–177° C.

The corresponding 3-methoxy substituted derivative (melting with decomposition at about 168–185° C.) is prepared by reaction of 2 - azido - 3-methoxy-1,4-naphthoquinone with triphenylphosphine employing toluene as the reaction medium.

EXAMPLE 2

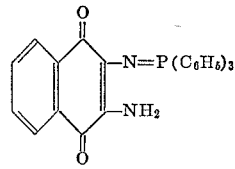

A solution of 1.90 parts of N,N'-(1-4-dihydro-1,4-dioxo - 2,3 - naphthylene)bis(P,P,P - triphenylphosphine imide) in 7 parts of glacial acetic acid is treated with 2 parts of concentrated hydrochloric acid. After boiling for 2 minutes, the solution is diluted with 3 parts of water and boiled again for 2 minutes. Water is added plus sufficient ammonium hydroxide to give an alkaline reaction. A blue oil is removed by extracting with ethyl acetate. From the ethyl acetate solution, there is obtained a blue crystalline product melting at 186.5–187.5° C.

EXAMPLE 3

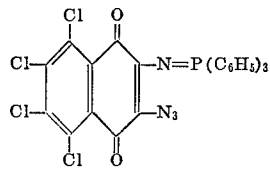

A solution of 1.75 parts (0.333 mole) of triphenylphosphine in 5 parts of toluene is added to a solution of 1.03 parts (0.003 mole) of 2,3 - diazido - 5,6,7,8 - tetrachloro-1,4-naphthoquinone in 70 parts of toluene. The toluene is evaporated and the residue is extracted with benzene. The insoluble material, after recrystallization from chlorobenzene, appears as yellow crystals melting at 131.5–133.5° C.

EXAMPLE 4

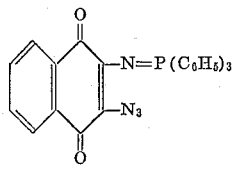

A solution of 1.31 parts (0.005 mole) of triphenylphosphine in 15 parts methylene chloride is added dropwise to a solution of 1.20 parts (0.005 mole) of 2,3-diazido-1,4-naphthoquinone in 175 parts of methylene chloride at 20–25° C. After removal of the methylene chloride by vacuum distillation at 20–25° C., the residue is stirred with benzene. The insoluble material is separated from the benzene by filtration, and the benzene is evaporated leaving a purple residue. After purification, this residue melts at 122.5–123.3° C. and the infrared spectrum shows the presence of an azido group.

EXAMPLE 5

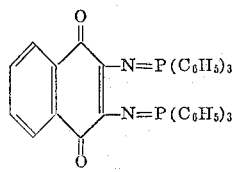

A solution of 2.75 parts (0.0105 mole) of triphenylphosphine in 10 parts of ethyl acetate is added gradually to a suspension of 1.20 parts (0.005 mole) of 2,3-diazido-1,4-naphthoquinone in 45 parts of ethyl acetate at 20–25° C. The reaction mixture is heated to the boiling point, and the precipitate obtained by cooling the reaction mixture is separated by filtration. The product, after purification is a blue crystalline material melting at 246–247° C.

EXAMPLE 6

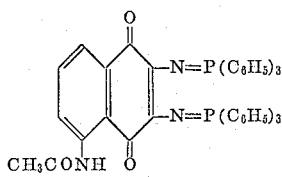

A solution of 5.0 parts of triphenylphosphine in about 15 parts of methylene chloride is added slowly to a solution of 2.60 parts of 5-acetamino-2,3-diazido-1,4-naphthoquinone in about 270 parts of methylene chloride at ambient temperature. When evolution of gas has ceased, the solvent is partially removed by evaporation. The residual solution is cooled, and the crystalline precipitate separated by filtration. The filtrate remaining after the separation of the solid is evaporated to a very small volume. The green precipitate is separated and washed with petroleum ether. The product, after recrystallization from chlorobenzene, melts at 274.5–277.0° C.

EXAMPLE 7

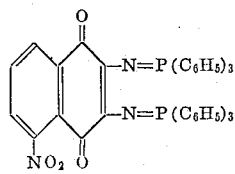

A solution of 5.8 parts of triphenylphosphine in about ten parts of benzene is added slowly to a suspension of 2.91 parts of 2,3-diazido-5-nitro-1,4-naphthoquinone in about 90 parts of benzene at ambient temperature. The reaction is continued until the mixture becomes green. The solvent is partially evaporated, and the residual solution, when cooled, deposits red crystals which are filtered off from the green solution. The green filtrate is evaporated to dryness and the residue after purificaiton by extraction with nitromethane and crystallization from chlorobenzene and benzene, melts at 286.5–288.5° C.

EXAMPLE 8

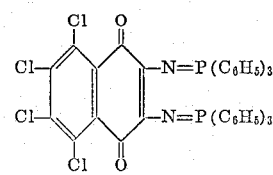

From the benzene solution obtained in Example 3, a second product is isolated, which after crystallization from benzene, appears as red crystals melting at 251.5–252.5° C.

EXAMPLE 9

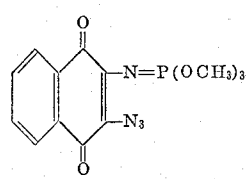

A solution of 1.35 parts (0.0109 mole) of trimethyl phosphite in 7 parts of methylene chloride is added dropwise to a solution of 2.40 parts (0.01 mole) of 2,3-diazido-1,4-naphthoquinone in 200 parts of methylene chloride at 20–25° C. After about one hour, the reaction mixture is evaporated to a small volume and the residue is washed with cyclohexane followed by petroleum ether. The red product, after crystallization from cyclohexane, melts at 99.5–100.5° C.

EXAMPLE 10

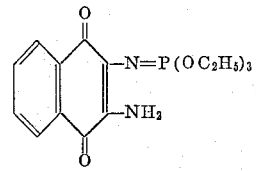

A solution of 1.81 parts (0.0109 mole) of triethyl phosphite in 5 parts of benzene is added dropwise to a solution of 1.2 parts (0.01 mole) of 2,3-diazido-1,4-naphthoquinone in 130 parts of benzene. From the reaction mixture there may be separated by chromatographic procedures a red product melting at 131.3–133.4° C.

EXAMPLE 11

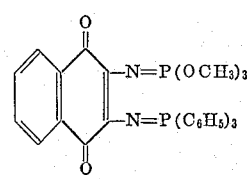

To a solution of 0.67 part of trimethyl 3-azido-1,4-dihydro-1,4-dioxo-2-naphthylphosphorimidate in 5 parts of methylene chloride there is added 0.65 part of triphenylphosphine at 20–25° C. After about 20 minutes, the solvent is removed by evaporation and the residue is dissolved in benzene. The product may be separated by chromatography. It is a purple crystalline material melting at 201–202° C.

EXAMPLE 12

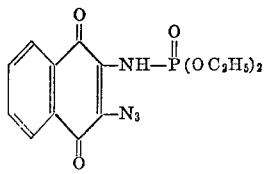

A solution of 1.8 parts (0.0113 mole) of triethyl phosphite in 10 parts of ethyl acetate is added slowly to a solution of 1.20 parts (0.005 mole) of 2,3-diazido-1,4-naphthoquinone in 175 parts of ethyl acetate at 20–25° C. The solvent is removed by evaporation, and the residue is dissolved in a minimum amount of glacial acetic acid. To this solution there is added about an equal volume of concentrated hydrochloric acid and the same amount of water. The solution is boiled, whereupon an orange precipitate forms. The product, M.P. 130–131° C., is obtained by separating the precipitate, and recrystallizing it from ethyl acetate.

EXAMPLE 13

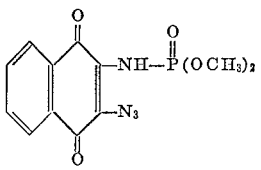

To a solution of 0.20 part of trimethyl-3-azido-1,4-dihydro-1,4-dioxo-2-naphthylphosphorimidate (product of Example 9) in 2 parts of glacial acetic acid there is added 1 part of concentrated hydrochloric acid and about 0.5 part of water. When the reaction mixture is warmed, there is a color change from red to orange. After adding additional water, the precipitate is filtered off, washed with water and methanol and dried. The orange product melts at 126–127° C.

We claim:
1. A compound of the formula:

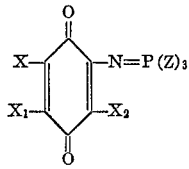

wherein $X_2$ is a radical selected from the group consisting of —N=P(Z)$_3$, hydrogen, azido, halogen, lower alkyl, lower alkoxy, phenyl, benzyl, phenethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio and nitro;
  each Z represents a radical selected from the group consisting of secondary amino, tertiary amino, alkyl of up to 18 carbon atoms, alkenyl of up to 18 carbons, benzyl, phenethyl, naphthylmethyl, cinnamyl, styryl, phenyl, naphthyl, alkoxy of up to 18 carbon atoms, alkenoxy of up to 18 carbons, benzyloxy, phenylethoxy, 2-naphthylmethoxy, 6-phenylhexyloxy, cinnamyloxy and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl; and
  X and $X_1$ are individually selected from the group consisting of hydrogen, halogen, lower alkyl, lower alkoxy, phenyl, phenylethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro, and together, a benzo group, said benzo group bearing substituents, if any, selected from the group consisting of halo, nitro, amino and lower alkanamido.

2. A 2,3-di-[P,P,P - (tri-substituted)phosphoranylideneamino]-1,4-naphthoquinone wherein each substituent is a radical selected from the group consisting of secondary amino, tertiary amino, alkyl of up to 18 carbons, alkenyl of up to 18 carbons, benzyl, phenethyl, naphthylmethyl, cinnamyl, styryl, phenyl, naphthyl, alkoxy of up to 18 carbons, alkanoxy of up to 18 carbons, benzyloxy, phenylethoxy, 2-naphthylmethoxy, 6-phenylhexyloxy, cinnamyloxy, and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl.

3. A 2 - [P,P,P - (tri - substituted)phosphoranylideneamino]-1,4-naphthoquinone wherein each substituent is a radical selected from the group consisting of secondary amino, tertiary amino, alkyl of up to 18 carbons, alkenyl of up to 18 carbons, benzyl, phenethyl, naphthylmethyl, cinnamyl, styryl, phenyl, naphthyl, alkoxy of up to 18 carbons, alkanoxy of up to 18 carbons, benzyloxy, phenylethoxy, 2-naphthylmethoxy, 6-phenylhexyloxy, cinnamyloxy, and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl.

4. A process which comprises (1) reacting a para-quinone selected from the group consisting of monocyclic and bicyclic 2-azido - 1,4 - benzoquinones, 2,3-diazo-1,4-benzoquinones, 2-azido-1,4-naphthoquinones and 2,3-diazido-1,4-naphthoquinones with one to two moles of a trivalent phosphorous compound of the formula:

$$P\equiv(Z)_3$$

said reaction being conducted at ambient temperature in an inert solvent medium; and (2) recovering from the reaction mixture a product of the formula:

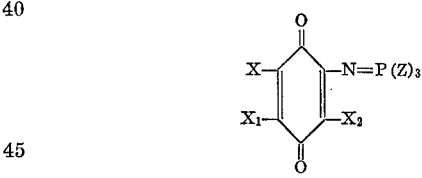

wherein $X_2$ is a radical selected from the group consisting of —N=P(Z)$_3$, hydrogen, azido, halogen, lower alkyl, lower alkoxy, phenyl, benzyl, phenethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkythio, phenylthio and nitro;
  each Z represents a radical selected from the group consisting of secondary amino, tertiary amino, alkyl of up to 18 carbons, alkenyl of up to 18 carbons, benzyl, phenethyl, naphthylmethyl, cinnamyl, styryl, phenyl, naphthyl, alkoxy of up to 18 carbon atoms, alkenoxy of up to 18 carbons, benzyloxy, phenylethoxy, 2-naphthylmethoxy, 6-phenylhexyloxy, cinnamyloxy and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl; and
  X and $X_1$ are individually selected from the group consisting of hydrogen, halogen, lower alkyl, lower alkoxy, phenyl, phenylethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro, and together, a benzo group, said benzo group bearing substituents, if any, selected from the group consisting of halo, nitro, amino and lower alkanamido.

5. The process of claim 4 wherein the quinone is 2,3-diazido-1,4-naphthoquinone.

6. The process of claim 4 wherein the phosphorous compound is a triarylphosphine.

7. The process of claim 4 wherein the phosphorous compound is a phosphorous triamide.

8. A compound having the formula:

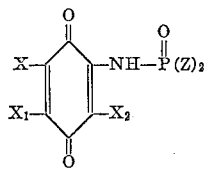

wherein $X_2$ is a radical selected from the group consisting of $-N=P(Z)_3$, hydrogen, azido, halogen, lower alkyl, lower alkoxy, phenyl, benzyl, phenethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro and $-NH-P(O)-(Z)_2$;

each Z represents a radical selected from the group consisting of secondary amino, tertiary amino, alkyl of up to 18 carbons, alkenyl of up to 18 carbons, benzyl, phenethyl, naphthylmethyl, cinnamyl, styryl, phenyl, naphthyl, alkoxy of up to 18 carbon atoms, alkenoxy of up to 18 carbons, benzyloxy, phenylethoxy, 2-naphthylmethoxy, 6-phenylhexyloxy, cinnamyloxy and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl; and X and $X_1$ are individually selected from the group consisting of hydrogen, halogen, lower alkyl, lower alkoxy, phenyl, phenylethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro, and together, a benzo group, said benzo group bearing substituents, if any, selected from the group consisting of halo, nitro, amino and lower alkanamido.

9. The compound of claim 8 wherein X and $X_1$ are joined to form a benzo group.

10. The compound of claim 8 wherein each Z is a lower alkoxy.

11. A process which comprises hydrolyzing a compound of the formula:

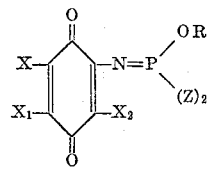

said hydrolysis being effected in an aqueous strong acid at elevated temperature; and recovering the product of the formula:

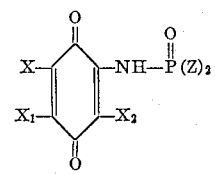

wherein X and $X_1$ are individually selected from the group consisting of hydrogen, halogen, lower alkyl, lower alkoxy, phenyl, benzyl, phenethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro, and together, a benzo group, said benzo group bearing substituents, if any, selected from the group consisting of halo, nitro, amino and lower alkanamido;

each Z is a radical selected from the group consisting of secondary amino, tertiary amino, alkyl of up to 18 carbons, alkenyl of up to 18 carbons, benzyl, phenethyl, naphthylmethyl, cinnamyl, styryl, phenyl, naphthyl, alkoxy of up to 18 carbon atoms, alkenoxy of up to 18 carbon atoms, benzyloxy, phenylethoxy, 2-naphthylmethoxy, 6-phenylhexyloxy, cinnamyloxy and styryloxy; said secondary amino and tertiary amino carrying, respectively, one and two substituents selected from the group consisting of lower alkyl, lower alkenyl, phenyl, naphthyl, benzyl, phenethyl, cinnamyl and styryl;

R is a radical selected from the group consisting of lower alkyl, lower alkenyl, benzyl and phenethyl; and $X_2$ is a radical selected from the group consisting of $-N=P(Z)_3$, hydrogen, azido, halogen, lower alkyl, lower alkoxy, phenyl, benzyl, phenethyl, amino, cyano, thiocyano, lower alkanoyl, benzoyl, naphthoyl, lower alkanoyloxy, nitroso, lower alkylsulfonyl, phenyl sulfonyl, naphthyl sulfonyl, lower alkanoylamino, lower alkylthio, phenylthio, nitro and $$-NH-P(O)-(Z)_3$$

No references cited.

JOHN D. RANDOLPH, *Primary Examiner.*

NICHOLAS S. RIZZO, WALTER A. MODANCE,
*Examiners.*

ROBERT T. BOND, *Assistant Examiner.*